United States Patent
Siswick et al.

(10) Patent No.: US 9,948,679 B2
(45) Date of Patent: Apr. 17, 2018

(54) OBJECT-RELATION USER INTERFACE FOR VIEWING SECURITY CONFIGURATIONS OF NETWORK SECURITY DEVICES

(71) Applicant: Cisco Technology, Inc., San Jose, CA (US)

(72) Inventors: Zachary D Siswick, Framingham, MA (US); Umesh Kumar Miglani, North Chelmsford, MA (US); Daniel Hollingshead, Somerville, MA (US); Karyll Catubig, Salem, NH (US); Yedidya Dotan, Newton, MA (US); Denis Knjazihhin, Lexington, MA (US)

(73) Assignee: Cisco Technology, Inc., San Jose, CA (US)

( * ) Notice: Subject to any disclaimer, the term of this patent is extended or adjusted under 35 U.S.C. 154(b) by 120 days.

(21) Appl. No.: 14/976,338

(22) Filed: Dec. 21, 2015

(65) Prior Publication Data
US 2017/0054757 A1    Feb. 23, 2017

Related U.S. Application Data

(60) Provisional application No. 62/208,163, filed on Aug. 21, 2015.

(51) Int. Cl.
*H04L 29/06* (2006.01)
*G06F 3/0481* (2013.01)
*G06F 3/0484* (2013.01)

(52) U.S. Cl.
CPC .......... *H04L 63/20* (2013.01); *G06F 3/04817* (2013.01); *G06F 3/04842* (2013.01); *H04L 63/02* (2013.01); *H04L 63/102* (2013.01)

(58) Field of Classification Search
CPC ...................................................... H04L 63/20
See application file for complete search history.

(56) References Cited

U.S. PATENT DOCUMENTS 5,675,756 A * 10/1997 Benton .............. G05B 19/0426
715/839
5,887,139 A * 3/1999 Madison, Jr. ......... G06F 3/1454
709/223

(Continued)

FOREIGN PATENT DOCUMENTS

WO    00/78004 A2    12/2000

OTHER PUBLICATIONS

Kon et al.; Monitoring, security, and dynamic configuration with the dynamicTAO reflective ORB; Published in: Proceeding Middleware '00 IFIP/ACM International Conference on Distributed systems platforms; 2000; pp. 121-143; ACM Digital Library.*

(Continued)

*Primary Examiner* — Bradley Holder
(74) *Attorney, Agent, or Firm* — Edell, Shapiro & Finnan, LLC

(57) ABSTRACT

In a computer implemented method, selectable device icons that represent respective network security devices are generated for display. Responsive to a selection of one of the device icons, selectable interface icons that represent respective network interfaces used by the network security device represented by the selected device icon are generated for display. Responsive to a selection of one of the interface icons, selectable policy icons that represent respective security polices applied to the network interface represented by the selected interface icon are generated for display. Responsive to a selection of one of the policy icons, selectable object group icons that represent respective groups of security rule objects used in the network security policy represented by the selected policy icon are generated for display.

22 Claims, 15 Drawing Sheets

(56) References Cited

U.S. PATENT DOCUMENTS

| | | | | |
|---|---|---|---|---|
| 5,889,954 A * | 3/1999 | Gessel | H04L 41/0816 | 370/467 |
| 5,999,179 A * | 12/1999 | Kekic | H04L 41/0213 | 715/734 |
| 6,009,466 A * | 12/1999 | Axberg | G06F 8/34 | 709/220 |
| 6,012,100 A * | 1/2000 | Frailong | H04L 41/082 | 709/220 |
| 6,269,398 B1 * | 7/2001 | Leong | H04L 41/0213 | 703/21 |
| 6,272,537 B1 * | 8/2001 | Kekic | G06F 8/34 | 709/203 |
| 6,307,546 B1 * | 10/2001 | Wickham | H04L 41/22 | 345/539 |
| 6,308,205 B1 * | 10/2001 | Carcerano | H04L 41/0253 | 709/220 |
| 6,903,755 B1 * | 6/2005 | Pugaczewski | H04L 41/00 | 715/735 |
| 7,003,562 B2 | 2/2006 | Mayer | | |
| 7,093,283 B1 * | 8/2006 | Chen | H04L 63/20 | 709/242 |
| 7,146,639 B2 | 12/2006 | Bartal et al. | | |
| 7,240,102 B1 * | 7/2007 | Kouznetsov | H04L 29/12216 | 709/220 |
| 7,278,104 B1 * | 10/2007 | DeBruler | H04L 41/22 | 715/736 |
| 7,472,412 B2 | 12/2008 | Wolf et al. | | |
| 7,512,965 B1 * | 3/2009 | Amdur | H04L 63/20 | 726/1 |
| 8,256,002 B2 | 8/2012 | Chandrashekhar et al. | | |
| 8,595,347 B2 * | 11/2013 | Chari | H04L 41/0893 | 709/224 |
| 9,128,605 B2 | 9/2015 | Nan et al. | | |
| 2002/0091797 A1 * | 7/2002 | Wallenius | H04Q 3/0033 | 709/218 |
| 2003/0071840 A1 * | 4/2003 | Huang | H04L 41/22 | 715/736 |
| 2004/0260818 A1 | 12/2004 | Valois et al. | | |
| 2005/0262554 A1 * | 11/2005 | Brooks | H04L 63/0263 | 726/11 |
| 2005/0273859 A1 | 12/2005 | Chess et al. | | |
| 2006/0026275 A1 * | 2/2006 | Gilmour | H04L 41/22 | 709/223 |
| 2006/0053389 A1 | 3/2006 | Michelman | | |
| 2006/0129837 A1 * | 6/2006 | Im | H04L 63/062 | 713/184 |
| 2006/0274774 A1 * | 12/2006 | Srinivasan | H04L 41/0809 | 370/420 |
| 2008/0101258 A1 * | 5/2008 | Cheng | H04L 12/66 | 370/254 |
| 2008/0134286 A1 * | 6/2008 | Amdur | G06F 21/604 | 726/1 |
| 2009/0125953 A1 * | 5/2009 | Porter | H04N 21/23103 | 725/109 |
| 2010/0005505 A1 | 1/2010 | Gottimukkala et al. | | |
| 2012/0331545 A1 * | 12/2012 | Baliga | H04L 63/145 | 726/15 |
| 2013/0219496 A1 * | 8/2013 | Nie | H04L 63/1408 | 726/22 |
| 2013/0254519 A1 * | 9/2013 | Benoit | H04W 12/04 | 713/1 |
| 2014/0101720 A1 * | 4/2014 | Xie | H04L 67/34 | 726/3 |
| 2014/0109177 A1 | 4/2014 | Barton et al. | | |
| 2014/0281478 A1 * | 9/2014 | Huang | H04W 12/04 | 713/150 |
| 2014/0359749 A1 * | 12/2014 | Rieke | H04L 63/02 | 726/11 |
| 2015/0128116 A1 | 5/2015 | Chen et al. | | |

OTHER PUBLICATIONS

Heberlein et al.; A network security monitor; Published in: Research in Security and Privacy, 1990. Proceedings., 1990 IEEE Computer Society Symposium on; Date of Conference: May 7-9, 1990; IEEE Xplore.*

International Search Report and Written Opinion in counterpart International Application No. PCT/US2016/047531, dated Oct. 26, 2016, 12 pages.

Juniper networks: "Security Director Application Guide", Feb. 25, 2015, XP55311738, Retrieved from the Internet: URL:http://www.juniper.net/techpubs/en_US/junos-space14.1/information-products/pathway-pages/junos-space-security-director-pwp.pdf (retrieved on Oct. 18, 2016), pp. 1-100.

Juniper networks: "Security Director Application Guide", Feb. 25, 2015, XP55311738, Retrieved from the Internet: URL:http://www.juniper.net/techpubs/en_US/junos-space14.1/information-products/pathway-pages/junos-space-security-director-pwp.pdf (retrieved on Oct. 18, 2016), pp. 101-200.

Juniper networks: "Security Director Application Guide", Feb. 25, 2015, XP55311738, Retrieved from the Internet: URL:http://www.juniper.net/techpubs/en_US/junos-space14.1/information-products/pathway-pages/junos-space-security-director-pwp.pdf (retrieved on Oct. 18, 2016), pp. 201-300.

Juniper networks: "Security Director Application Guide", Feb. 25, 2015, XP55311738, Retrieved from the Internet: URL:http://www.juniper.net/techpubs/en_US/junos-space14.1/information-products/pathway-pages/junos-space-security-director-pwp.pdf (retrieved on Oct. 18, 2016), pp. 301-400.

Juniper networks: "Security Director Application Guide", Feb. 25, 2015, XP55311738, Retrieved from the Internet: URL:http://www.juniper.net/techpubs/en_US/junos-space14.1/information-products/pathway-pages/junos-space-security-director-pwp.pdf (retrieved on Oct. 18, 2016), pp. 401-500.

Juniper networks: "Security Director Application Guide", Feb. 25, 2015, XP55311738, Retrieved from the Internet: URL:http://www.juniper.net/techpubs/en_US/junos-space14.1/information-products/pathway-pages/junos-space-security-director-pwp.pdf (retrieved on Oct. 18, 2016), pp. 501-596.

Richard J. MacFarlane, "An Integrated Firewall Policy Validation Tool", A thesis submitted in partial fulfilment of the requirements of Edinburgh Napier University for the Degree of Master of Science, in the Faculty of Engineering, Computing & Creative Industries, Sep. 2009, 148 pages.

* cited by examiner

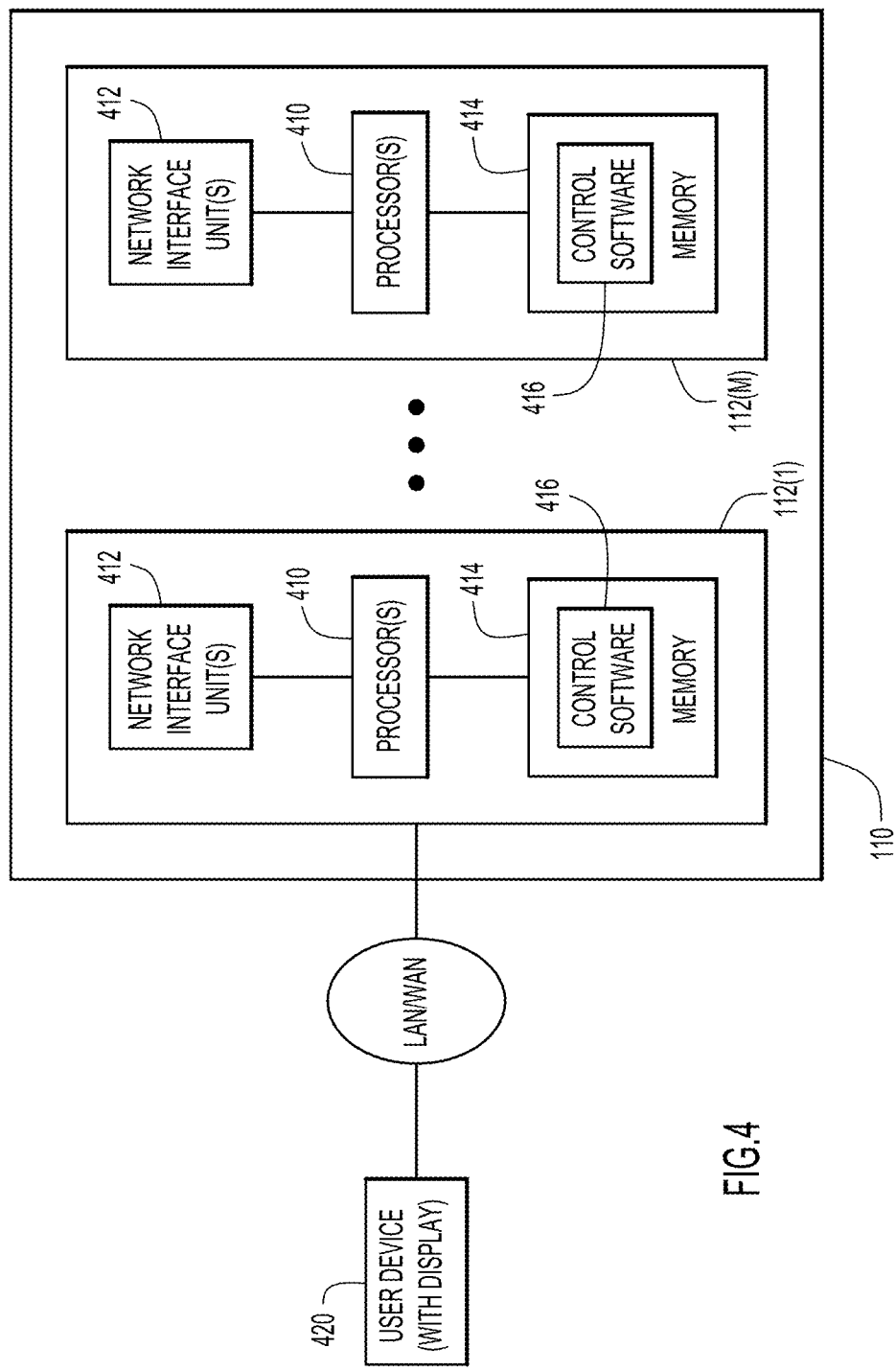

SECURITY RULE CLASSIFICATION DATABASE
632

| RULE INDEX | RULE IDENTIFIERS (E.G., POINTERS) | COMMONALITY TYPE |
|---|---|---|
| L1, L3 | R1 (L1, F1), R3 (L3, F1) | SIMILAR |
| L4 | R4 (L4, F1), R5 (L5, F2) | IDENTICAL |
| ... | ... | ... |

633 (LINKED TO OBJECT-RELATION DATABASE 350)

FIG.6B

OBJECT-RELATION USER INTERFACE FOR VIEWING SECURITY CONFIGURATIONS OF NETWORK SECURITY DEVICES

PRIORITY CLAIM

This application claims priority to U.S. Provisional Application No. 62/208,163, filed Aug. 21, 2015, the entirety of which is incorporated herein by reference.

TECHNICAL FIELD

The present disclosure relates to viewing security configurations of network security devices.

BACKGROUND

A customer datacenter typically includes various network security devices. The network security devices control access to network resources based on security policies that are applied by the network security devices. The security policies include security rules which include sets of components. The components define protocols, services, source and destination IP addresses and IP address ranges, network ports, action types (e.g., permit and deny), and the like. The components of the security rules may be referred to generally as objects. A challenge has been presenting to a user a large number of security policy objects that have complex relations with each other across multiple security policies and network security devices in a limited display space in a way that the user is able to readily identify anomalies and abnormalities in the objects, identify objects that are not anomalous, form links between objects, edit the objects, and have such changes be applied across the objects. A further challenge has been how to deal with the nesting of objects within objects. That is, a given top-level object may contain multiple objects at multiple levels-down from the top-level object. This nested structure is difficult to depict visually in a convenient manner.

BRIEF DESCRIPTION OF THE DRAWINGS

FIG. 4 is a block diagram of a hardware implementation for a management entity of the cloud-based management system of FIG. 1 that may be used with the object-relation UI, according to an example embodiment.

FIG. 6B is an illustration of an example security rule classification database generated by the method of FIG. 6A, according to an example embodiment.

DESCRIPTION OF EXAMPLE EMBODIMENTS

Overview

In a computer implemented method, selectable device icons that represent respective network security devices are generated for display. Responsive to a selection of one of the device icons, selectable interface icons that represent respective network interfaces used by the network security device represented by the selected device icon are generated for display. Responsive to a selection of one of the interface icons, selectable policy icons that represent respective security polices applied to the network interface represented by the selected interface icon are generated for display. The security policies include respective security rules, wherein each security rule includes objects arranged according to predetermined rule syntax to control access to a resource, and wherein at least some of the objects have respective object values. Responsive to a selection of one of the policy icons, selectable object group icons that represent respective groups of security rule objects used in the network security policy represented by the selected policy icon are generated for display.

Example Embodiments

An object-relation user interface (UI) enables a user to visualize configurations of network security devices. More specifically, the UI provides to the user a unique interactive visualization of object/object groups representing network security devices. The UI presents a large number of security policy objects having complex relations with each other (hence the name "object-relation" UI) in a limited display space in a way that enables the user to identify anomalies in the policy objects, identify objects that are not anomalous, form links between objects, edit the objects, and have such changes be applied across the objects. The UI also enables the user to navigate nested objects in a straightforward manner. The UI is targeted to a user who is generally familiar with security policies and their objects, but who is not necessarily comfortable with editing objects at a low level, such as at the level of an access control list. The object-relation UI greatly simplifies how to view security policies configured on network security devices.

Figure 1:
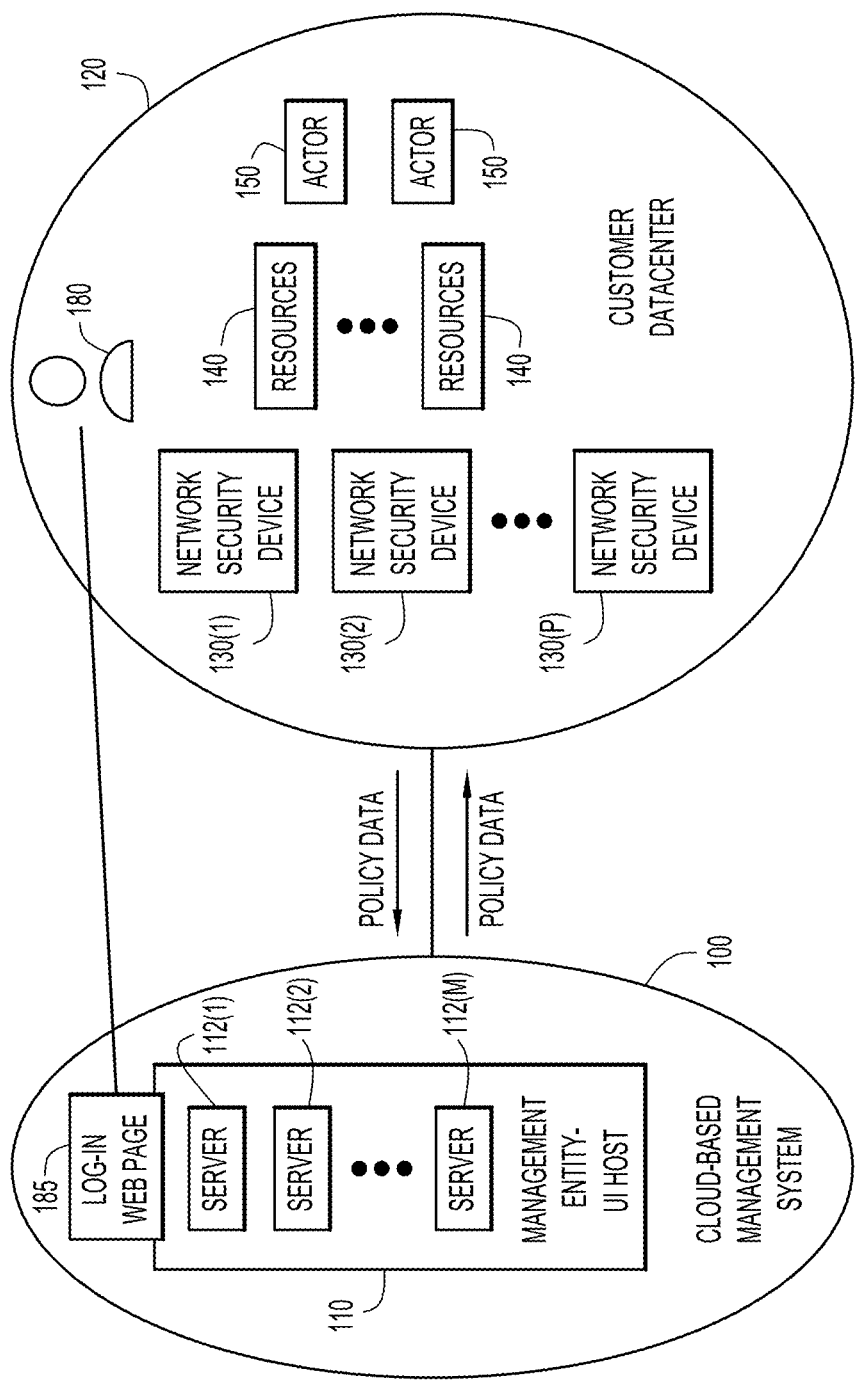
FIG. 1 is a cloud-based management system in which an object-relation user interface (UI) for viewing security policy configurations of network security devices may be used, according to example an embodiment.

With reference to FIG. 1, there is shown a cloud-based management system 100 in which an interactive object-relation UI (also referred to as simply the "UI") for viewing security policy configurations of network security devices may used, according to an embodiment. Cloud-based management system 100 communicates with network security devices of a customer datacenter 120. FIG. 1 shows the details of one customer datacenter, but it should be understood that the cloud-based management system 100 may connect and communicate with multiple customer datacenters.

The cloud-based management system 100 includes a management entity 110 including one or more computer servers 112(1)-112(M) that execute software to perform the operations associated with the UI. An example of a hardware configuration for management entity 110 is described in more detail below in connection with FIG. 4.

Customer datacenter 120 includes a plurality of network security devices or products (also referred to as network security appliances) 130(1)-130(P). Within a customer datacenter there are one or more resources 140 and one or more actors 150. The resources 140 may include servers, databases, and the actors 150 are users or processes using a computing device (personal computer, SmartPhone, etc.) that may seek access to one or more of the resources 140. The resources and actors may also reside outside the customer datacenter itself, e.g., in the Internet. The network security devices 130(1)-130(P) control access of the actors 150 to the resources 140 according to network security policies, e.g., sets of one or more network security rules configured on the respective network security devices. The UI mentioned above may be used to view and navigate through network security policy configurations of network devices 130, as described below.

Figure 2:
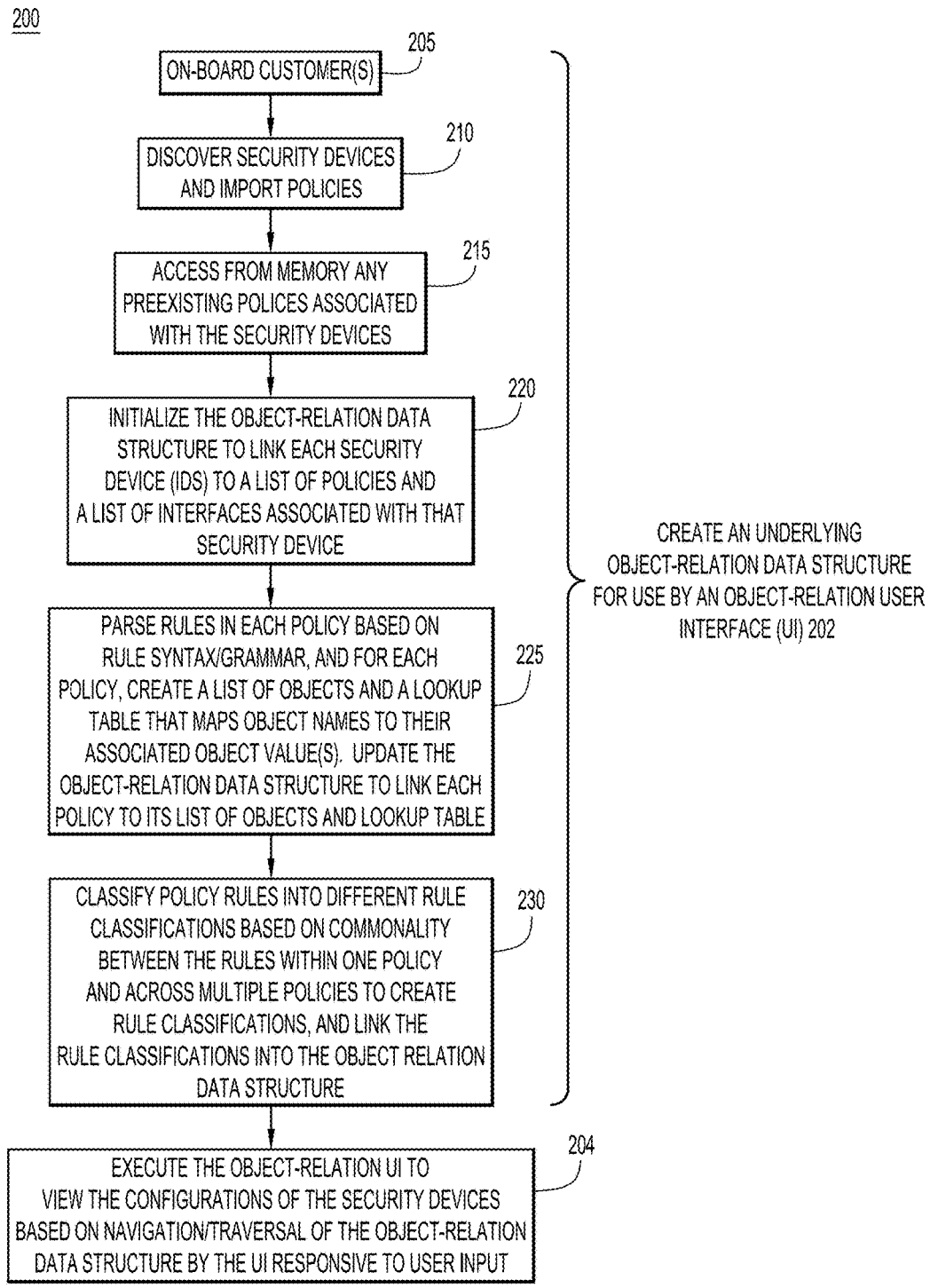
FIG. 2 is a flowchart of a method associated with using the object-relation UI, according to an example embodiment.

Turning now to FIG. 2, there is a flowchart of an example method 200 associated with using an object-relation UI. Method 200 includes a preparatory or background operation 202 to create an underlying object-relation data structure or database that is accessed and traversed by the UI when the UI is executed at subsequent operation 204. Background operation 202 includes further operations 205-230 now described with continued reference to FIG. 1.

At 205, a customer (e.g., a business or enterprise) is "on-boarded" to cloud-based management system 100. This involves a network administrator/user 180 logging on to a log-on web page 185 served by one of the servers 112(1)-112(M) of the management entity 110. The log-on web page 185 allows network administrator 180 to set up privileges to permit management entity 110 to communicate, over the Internet, with customer datacenter 120 in order to connect to network security devices 130(1)-130(P). In addition, during the initial log-in and setup phase, network administrator 180 provides names and address (e.g., Internet Protocol (IP) addresses) for each of network security devices 130 in customer datacenter 120. Other types of set-up processes may be used other than use of a log-on web page.

At 210, management entity 110 discovers network security devices 130 and may import the policies as policy data from each network security device. Briefly, this involves sending a connection string and device type tag to each network security device 130(i). Each network security device 130(i) responds with device descriptor and policy data for each network security rule configured on the respective network security device. An example subset of the policy data imported form a network security device may be:
  Protocol: HTTPS
  Network: All
  Destination: 132.180.0.0/24
  Description: Web
  Policy: On
  Logging: On In addition, management entity 110 identifies the types and numbers of network interfaces, e.g., Virtual Local Area Networks (VLANs) used by each of network security devices 130. Management entity 110 stores the discovered data describing the discovered network security devices 130 and their native policies. The native policies may be stored into respective configuration files (where each configuration file is also referred to as a "config file" or simply a "config"). Each native network security policy may be one or more native network security rules associated with a named network security device and formatted according to a corresponding native policy model for a network security device. Each native network security rule may in turn include a set of security rule parameters or components to permit or deny network access for the named network security device based on a network protocol, source and destination addresses, and a device port.

At 215, management entity 110 may also access network security policies for various ones of network security devices 130 from preexisting configuration files stored in management entity 110.

Figure 3A:
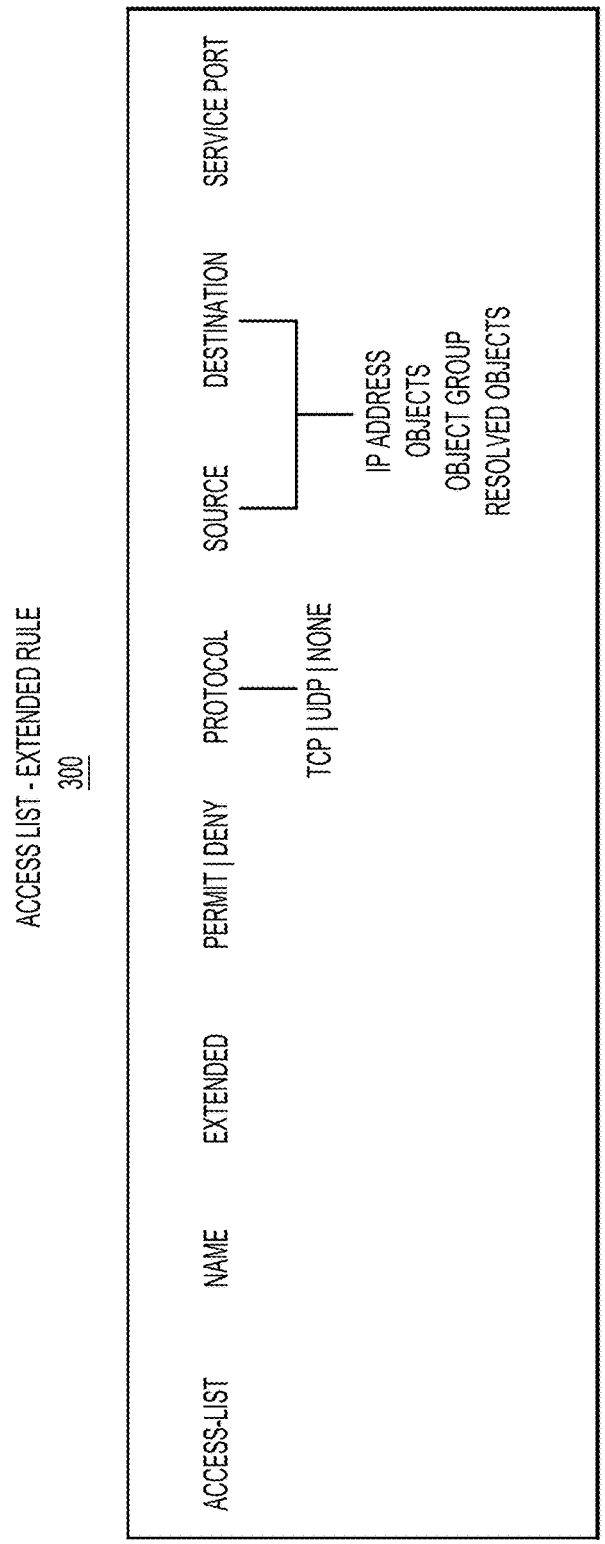
FIG. 3A is an illustration of a format or syntax for a security rule of a security policy on which the method of FIG. 2 may operate, according to an example embodiment.

With reference to FIG. 3A, there is an illustration of an example format or syntax for an example security rule 300 in the network security policies imported or otherwise accessed in operations 205-215. Security rule 300 is formatted as an access control list (ACL)—extended rule, including the following components, in which: "NAME" is an object or object group (i.e., a name of a group of rules); "EXT" is a constant; "PERMIT|DENY" is an access control imposed by the rule; "Protocol" is a communication protocol used for an attempted access and may be expressed as an object or an object group. "S" and "D" may each be a tuple that expresses a service port and address, and may be expressed as either an object or an object group, e.g., "all my inbound email" or "all my outbound email," or called by an object name. S and D may each be identified as a string. In an example, "any" means any port, any address.

Further examples of network security rules that the IDE may operate on include:
1. Access-list left-to-right extended permit ip host 172.16.1.10 host 192.168.1.10.
2. Access-list someName extended permit tcp 172.19.103.0 255.255.255.0 object-group Application-Servers object-group DM_INLINE_TCP_443.
3. Block all users from using facebook messaging.
4. Allow all users to use Linked in but only allow HR to post jobs on Linkedin®, allow all users to use Linkedin.

The components of security rule 300 described above are referred to broadly as "objects" of the security rule. Thus, the objects of security rule 300 are also referred to as "objects" of the security policy to which the security rule belongs.

Returning to FIG. 2, at 220, management entity 110 populates an object-relation data structure with network security device and security policy information gathered in operations 205-215. Specifically, management entity 110 populates the object-relation data structure with identifiers/names of network security devices 130 and maps or links each named network security device to (i) the (imported or otherwise accessed) security policies for that network security device, and (ii) the network interfaces used by that network security device. An example of the object-relation data structure is described below in connection with FIG. 3B.

Next operations 225 and 230 operate on each of the security policies (e.g., in their configuration files) imported or otherwise accessed in operations 205-215 to further populate the object-relation data structure with information, as now described. A given security policy may be represented as a named text file including multiple entries, e.g., sequential lines in the text file, at least some of which correspond to network security rules. Each network security rule includes multiple security rule parameters/components (i.e., objects) to cause a network security device to apply a network access control (e.g., permit or deny) when a source (e.g., an IP address or a range of IP addresses) attempts to access a destination (e.g., an IP address or a range of IP addresses). Either the destination or the source (or both) in some of the security rules may be represented as/by a respective object name associated with an object value defined in an object definition of the configuration file. For generality, the object name may name an object group or simply one object. Also, some of the configuration file entries may represent delineated remarks or comments interspersed among the security rules and that have no effect on the security appliance.

At 225, management entity 110 performs a parser operation, described here at a high-level, to parse the security rules of a given security policy based on a native security rule syntax/grammar to build (i) a mapping database, e.g., a lookup table, and (ii) a list of objects of the given security policy, including the number of objects. The mapping database maps object names in security rules to their associated object values. The parser operation is repeated for each security policy for each of network security devices 130 to build respective lookup tables and respective lists of objects for the various security policies. Management entity 110 updates the object-relation data structure to map each parsed security policy to its respective lookup table and list of objects.

At 230, management entity 110 classifies the security rules in each security policy into different security rule classifications based on commonality between the security rules. Also, management entity 110 classifies the security rules across the multiple policies based on commonality between the security rules across the multiple policies.

In an embodiment, the management entity 110 classifies the security rules, within one policy or across multiple policies, into one or more identical security rule classifications based on identicality (i.e., a measure of identicality) between the security rules, such that each identical security rule classification includes security rules that are identical to each other. Management entity 110 also classifies the security rules into one or more similar security rule classifications based on similarity (i.e., a measure of similarity) but not identicality between the security rules, such that each similar security rule classification includes security rules that are similar but not identical to each other. Management entity 110 stores the various security rule classifications in a security rule classification database that also associates each classified security rule with file location, including (i) a name of the configuration file in which the security rule is found, and (ii) a location, e.g., a line number, where the security rule is found in the configuration file for the security policy. An example classification database is described below in connection with FIG. 6B.

Management entity 110 links the rule classifications and information associated therewith into the object-relation data structure so that when operations 220, 225, and 230 have been completed the object-relation data structure maps or links (i) each network security device by name to its corresponding interfaces and security policies, (ii) each security policy to its corresponding object list and lookup table, and (iii) similar security rules to each other and identical security rules to each other across network security devices and security policies.

At 204, responsive to user interaction, the UI is invoked or executed to view the security policy configurations of network security devices 130 as represented in/by the object-relation data structure. The user may view and navigate through the security policy configuration of network security devices 130 based on user selections that cause the UI to correspondingly navigate/traverse the object-relation data structure.

Figure 3B:
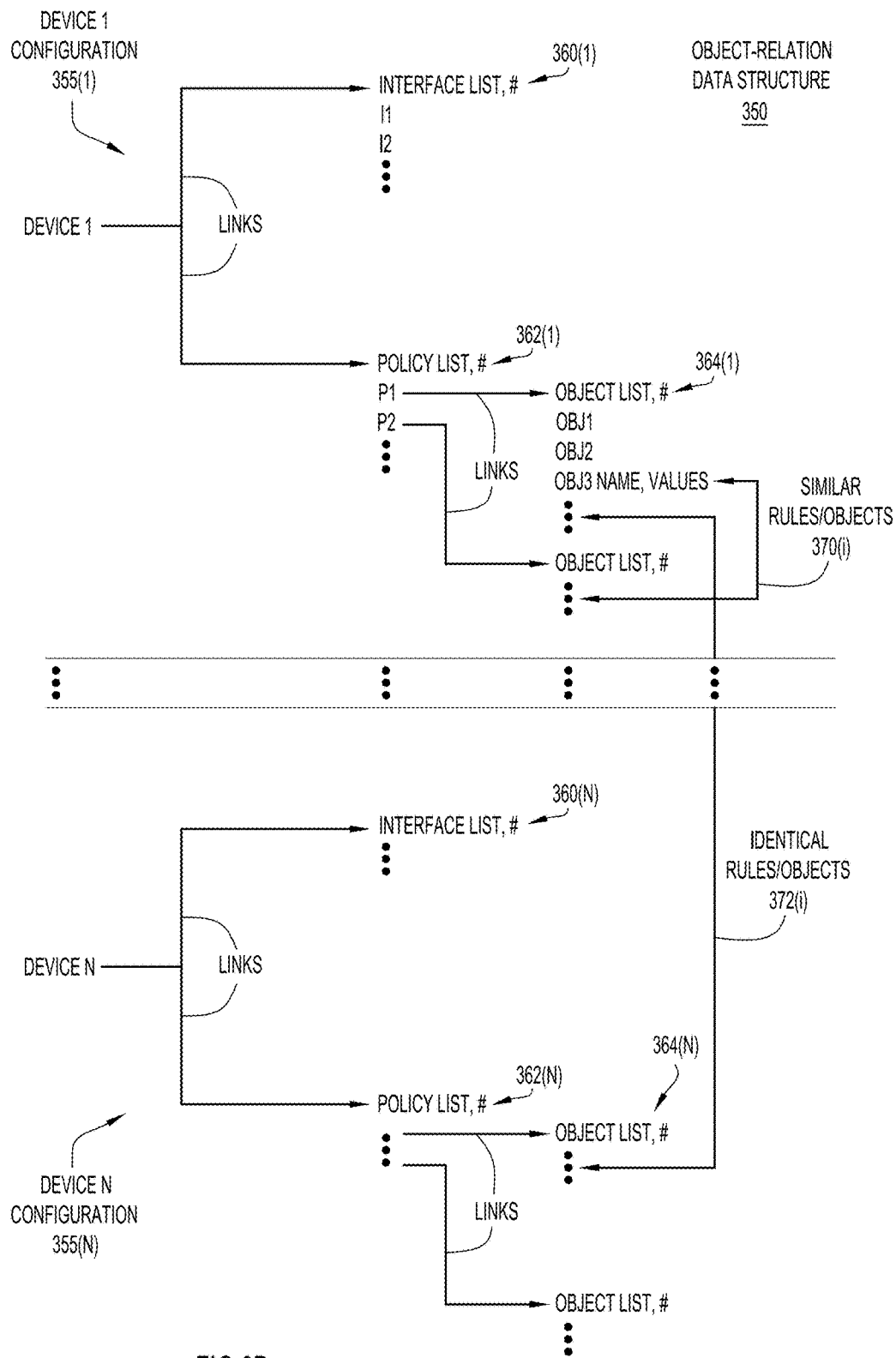
FIG. 3B is an illustration of an object-relation data structure created in the method of FIG. 2, according to an embodiment.

With reference to FIG. 3B, there is an illustration of the above-mentioned object-relation data structure, identified as object-relation data structure 350 in FIG. 3B, after operation 202 has been completed, according to an embodiment. Object-relation data structure 350 includes network device "configurations" 355(1)-355(N) each representing a security policy configuration of a corresponding one of network security devices Device1-DeviceN (e.g., network security devices 130(1), 130(2), and so on). Each configuration 355($i$) includes a network security device name (e.g., Device1, Device2, and so on) stored in a root node or record of the configuration. Each configuration 355($i$) also includes bi-directional, navigable, links or pointers from the root node to (i) a network interfaces list indicated generally at 360($i$) that lists network interfaces I1, I2, and so on, and the number "#" of network interfaces, and (ii) a security policy list indicated generally at 362($i$) that lists security policies P1, P2, and so on, and the number of security polices for that named network security device. Each configuration 355($i$) also includes a link from each listed security policy Pi to an object list indicated generally at 364($i$) that lists one or more groups of objects OBJ1, OBJ2, and so on, and a number of objects for that policy. Each group of objects includes one or more objects, including object names and object values. Information for each object list 364($i$) is provided from operation 225 of method 200. Additionally, object relation data structure 350 includes links 370($i$) between similar rules/objects and links 372($i$) between identical rules/objects generated during classify operation 230. In operation 204, the UI traverses the links of object-relation data structure 350 to access object-related information therein as necessary so that such information may be presented or displayed to a user in a series of interactive UIs, as described below in connection with FIGS. 6C and 7-12.

Turning now to FIG. 4, a block diagram is shown of an example hardware implementation for the management entity 110. In one example, the management entity 110 includes one or more servers 112(1)-112(M). Each server includes one or more processors 410, one or more network interface units 412 and memory 414. The memory 414 stores control software 416, that when executed by the processor(s) 410, cause the server to perform the various operations described herein for the management entity 110 and the UI. Local user input/output devices (not shown) may be coupled with management entity 110 to enable a user to enter information and receive information from the management entity. Such devices include, but are not limited to, a display, a keyboard, a mouse, and so on.

The processor(s) 410 may be a microprocessor or microcontroller (or multiple instances of such components). The network interface unit(s) 412 may include one or more network interface cards that enable network connectivity.

The memory 414 may include read only memory (ROM), random access memory (RAM), magnetic disk storage media devices, optical storage media devices, flash memory devices, electrical, optical, or other physically tangible (i.e., non-transitory) memory storage devices. Thus, in general, the memory 414 may comprise one or more tangible (non-transitory) computer readable storage media (e.g., memory device(s)) encoded with software or firmware that comprises computer executable instructions. For example, control software 416 includes UI logic to implement the operations and UIs generated for presentation/display as described herein. Memory 414 also stores data (not shown) generated and used by the aforementioned logic. For example, the data may include a mapping database to map object names expressed in security rules to object attributes, security rule classifications, the object-relation data structure, and various UI templates for population and display as screen shots.

Administrator 180 may interact with management entity 110 through the UIs described herein by way of a user device 420 that connects by way of a network (local area network (LAN) and/or wide area network (WAN)) with the management entity 110. The user device 420 may be a personal computer (laptop, desktop), tablet computer, SmartPhone, etc.

Figure 5:
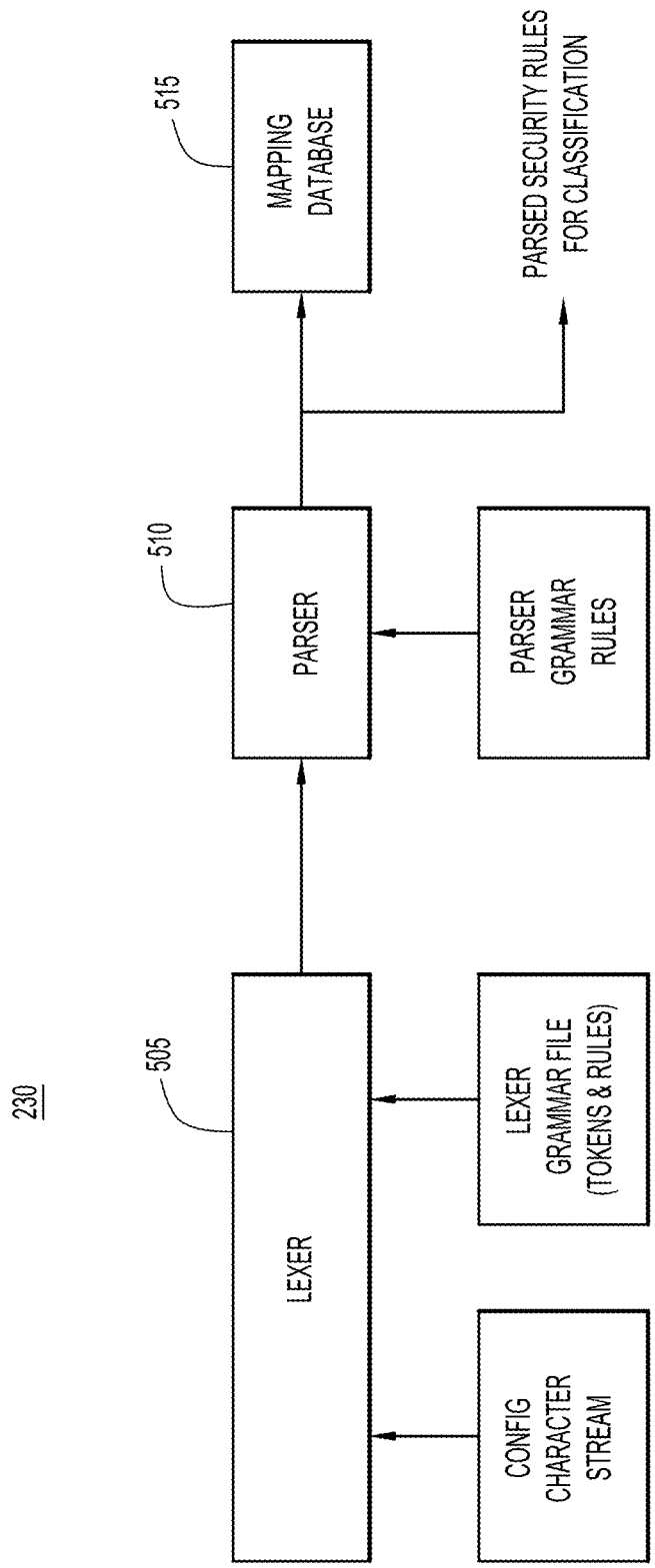
FIG. 5 is a flowchart of a generalized parser operation used in the method FIG. 2, according to an example embodiment.

With reference to FIG. 5, there is a flowchart expanding on high-level parser operation 230 of method 200, according to an embodiment.

A lexer operation 505 (also referred to as "lexer" 505) receives the configuration file and security policy represented therein, including the security rule parameters of the security rules, the object definitions, and the remarks, in the form of a character stream. Lexer 505 also receives a predetermined lexer grammar file for the security rules including acceptable security rule tokens and grammar rules for the tokens. Lexer 505 tokenizes the security rule parameters of each security rule based on the lexer grammar file to produce a stream of tokens, and delivers the stream of tokens to parser operation 510 (also referred to as "parser 510").

In addition to the stream of tokens, parser 510 receives predetermined parser grammar rules for the security rules. Parser 510 parses the stream of tokens, including object definitions and object names therein, based on the parser grammar rules to build a hierarchical parser tree from the tokens in the stream of tokens. Each time parser 510 encounters an object name while building the parser tree, the parser creates an entry for the object name in the mapping database (indicated at 515 in FIG. 5) that maps the object name to its attributes. Parser 510 searches the object definition tokens for the attributes defined for each object name. The attributes include (i) one or more values associated with the object name as defined in a corresponding configuration file object definition, and (ii) a location in the configuration file, e.g., a line number, of the security rule in which the object name is found. Mapping database 515 may be implemented as a lookup table that uses a hash map to map each object name to its corresponding attributes. Objects and mapping information from mapping database 515 may be linked with and accessible through traversal of object-relation data structure 355 as necessary to enable the UI-related methods described herein. Parser 510 also delivers each parsed security rule to security rule classification operation 230, described in detail below.

Returning again to FIG. 2, at operation 230, management entity 110 classifies security rules into security rule classifications. To do this, management entity 110 compares each security rule to every other security rule in the configuration file or to every other security rule across multiple configuration files to determine how similar the security rule is to the other security rules based on one or more commonality/similarity criteria. Based on results of the compare, management entity 110 classifies the security rule into one or more security rule classifications, such as identical classifications or similar classifications. As mentioned above, each security rule typically includes security rule parameters/components (i.e., objects), such as a name of a group of rules (e.g. "inside-in" vs. "inside-out"), an access control (e.g., permit or deny), a protocol (e.g., IP, TCP, UDP, ICMP), a source (e.g., IP address), a destination (e.g., IP address), device/service ports, interfaces, and/or context (e.g. a deny rule surrounded by other deny rules), where some of the security rule parameters may be expressed as an object name or object group name associated with attributes. The security rule parameters represent points of comparison used to classify the security rules. For example, to compare two security rules, their corresponding security parameters or points of comparison are compared, as will be described below.

Figure 6A:
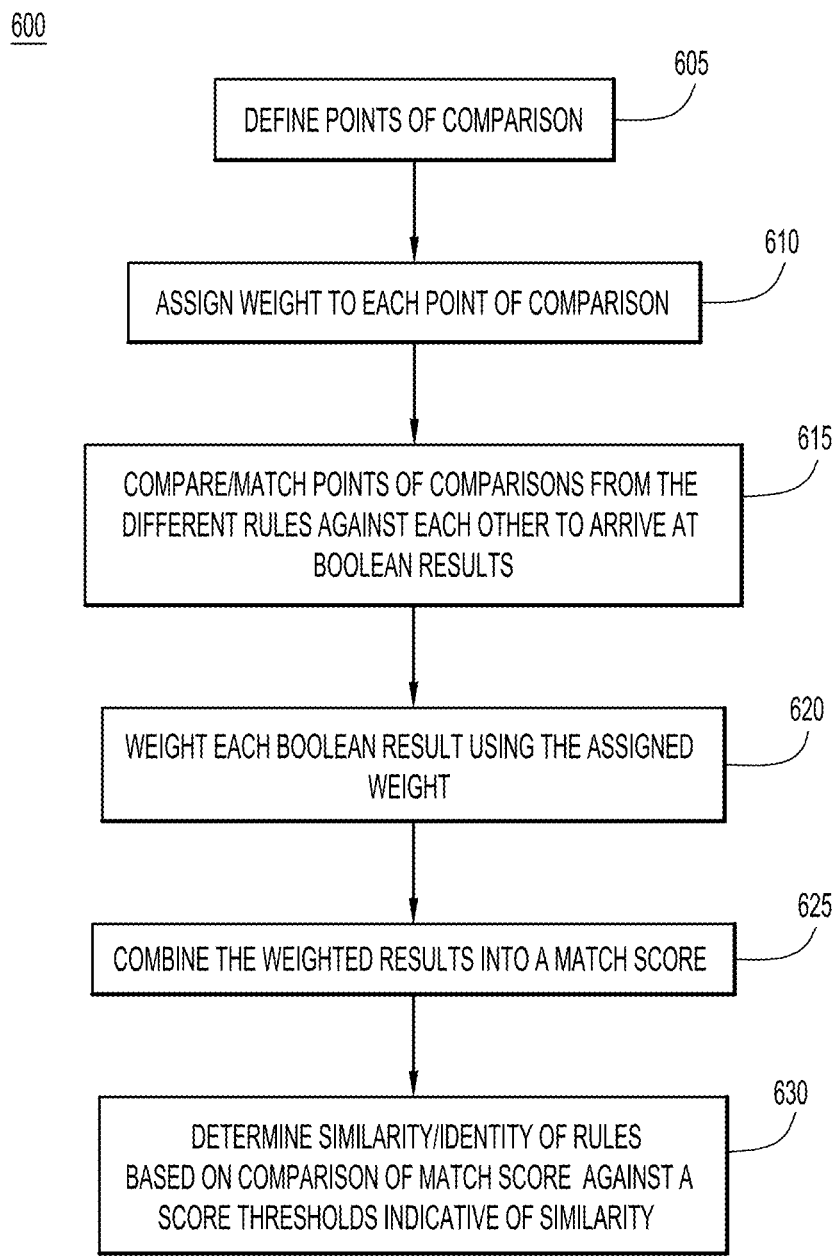
FIG. 6A is a flowchart of operations expanding on a classify operation of the method of FIG. 2, according to an example embodiment.

With reference to FIG. 6A, there is a flowchart of operations 600 expanding on classify operation 230 of method 200. Operations 600 determine commonality/similarity between security rules based on their corresponding points of comparison (i.e., corresponding security parameters), and classify the security rules based on results of the determine operation.

At 605, different points of comparison (i.e., security rule parameters) are defined. These points of comparison will form a basis for a determination as to whether different security rules are sufficiently similar as to be placed together into a similar security rule classification or sufficiently identical to be placed together into a an identical security rule classification.

At 610, a weight or coefficient $w_i$ is assigned to each point of comparison.

At 615, corresponding ones of the points of comparison from the different security rules being compared are compared to each other to arrive at a Boolean result, e.g., match=1, no match=0.

At 620, each Boolean result is multiplied by the corresponding assigned weight to produce weighted Boolean results.

At 625, the Boolean results are combined into a match score according to a predetermined expression/equation.

At 630, the match score is compared to a non-zero similarity score threshold and a non-zero identicality score threshold that is greater than the similarity score threshold. If the compare indicates the match score is equal to or greater than the similarity score threshold but less than the identicality score threshold, the different (compared) network security rules are deemed similar to each other and thus classified into the similar security rule classification. If the compare indicates the match score is equal to or greater than the identicality score threshold, the different network security rules are deemed identical to each other and thus classified into the identical security rule classification. If the compare indicates the match score is below the similarity score threshold, the different network security policies are deemed dissimilar to each other and, optionally, may be classified into a unique classification. When a security rule is classified into a similar or identical security rule classification, the security rule is entered into the classification along with a descriptor that identifies the file location (e.g., line number and file name) of that security rule as well as an indicator of the type of commonality, e.g., similar or identical, associated with the classification.

In an example in which operation 605 of method 600 defines as the points of comparison various rule parameters used in the access list—extended model, operation 625 may evaluate the following expression, in which "match on <point of comparison>?|" defines a match/comparison test that evaluates to a Boolean result:

match score=$w_1$|match on name?|*$w_2$|match on permit/deny?|*$w_3$|match on protocol?|*$w_4$|match on source address?|*$w_5$|match on destination address?|+[$w_6$|match on service ports?|+ $w_7$|match on rule context?|].

In the above equation for match score, both a multiplicative combination and an additive combination of tests results are used. The multiplicative combination is used for points of comparison deemed of higher importance, while the additive combination is used for points of comparison deemed of lower importance. Also, weights wi may be initially set to 1, but other values may be used. In addition, the similar score threshold may be set to 2 and the identical score threshold may be set to 4, for example, so that if the match score evaluates to 2 or 3, the security rules being compared are deemed similar, and if the match score evaluates to 4 or greater, the security rules being compared are deemed identical, otherwise the security rules are deemed unique.

With reference to FIG. 6B, there is an illustration of an example security rule classification database 632 generated by method 600. In the example of FIG. 6B, database 600 is represented as a table having rows 633 each to represent a respective security rule classification into which multiple security rules have been classified. The columns include: a rule index that lists file locations, such as line numbers L1, L2, and so on, that are an index, key, or pointer to the security rules in the security rule classification for the given row; security rule identifiers including the location (e.g., line number Li and filename Fi) of each security rule Ri in the security rule classification for the given row; and a commonality type for the security rule classification for the given row (e.g., "similar" or "identical"). The security rule identifiers, e.g., line number Li and filename Fi, may include address pointers to a given line number Li in a given named file Fi for a given security rule Ri. In the example of FIG. 6B, row 1 represents a similar security rule classification into which similar security rules R1 (located at line L1 in filename F1) and R2 (located at line L2 in filename F1) are classified. Row 2 represents an identical security rule classification into which identical security rules R4 (located at line L4 in filename F1) and R5 (located at line L2 in filename F2) are classified. The information in security rule classification database 632 may be organized in many different ways, such as in one or more linked lists of classification nodes that each store rule locations and indicators of commonality type. The entries in each of rows 633 of security rule classification database 632 may be linked to, or merged with, the information nodes in object-relation database 350 so that a traversal of the various links in the object-relation database also leads to a corresponding traversal of the entries in the rule classification database, which in turn leads to retrieval of security rules (and the security rule objects defined thereby) that are similar and/or identical across network security policies linked with the object relation database.

Returning again to FIG. 2, at operation 204, the user executes the object-relation UI to view and navigate through device configurations. It is assumed that prior to executing the UI, background processing 202 has already accessed or imported multiple security policies from/for multiple security devices 130, and identified objects in those security policies that are identical across the security policies, similar to each other across the security policies, and objects that are isolated to one security policy, or that are not actually used. It is also assumed that background processing 202 has generated underlying object-relation data structure 350 having entries to link each security policy to its corresponding objects, and the objects to their corresponding low-level content, e.g., values. The entries for objects in object-relation data structure 350 also identify other relevant entries corresponding to similar and/or identical objects. For example, entries may include links or pointers to the other relevant entries. The UI access the entries of the underlying database as needed in support of the UI functionality. Object-relation data structure 350 and the object-relation UI work together or interact with each other as described below in connection with FIG. 6B.

Figure 6C:
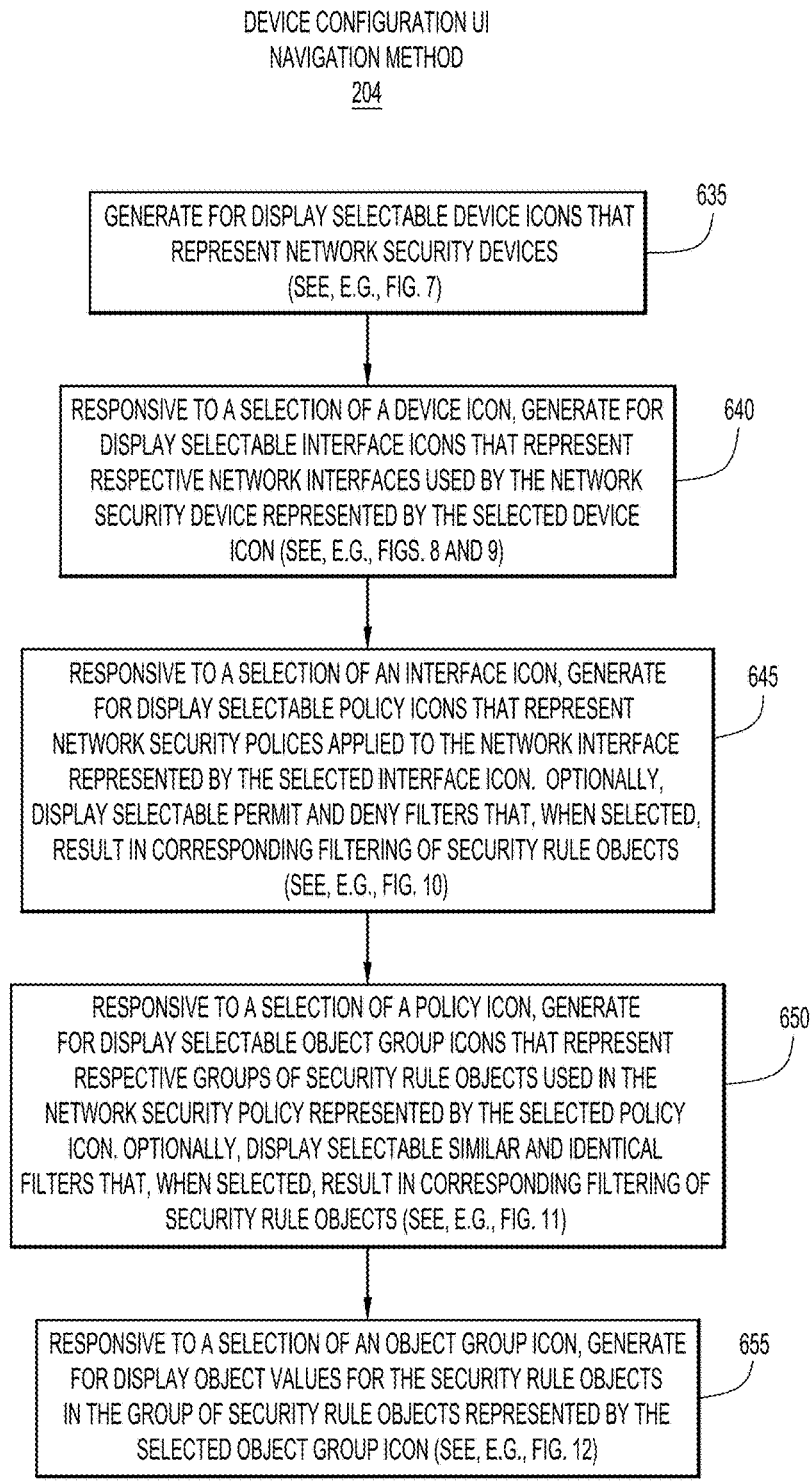
FIG. 6C is a flowchart of a method of navigating through UIs to view device configurations responsive to user input/selections, according to an example embodiment.

With reference to FIG. 6C, there is a flowchart of operations expanding on operation 204, which collectively represent a method of navigating through and interacting with UIs to view device configurations responsive to user input/selections. The operations of FIG. 6C are described also with reference to FIGS. 7-12, which represent example screen shots of UIs that may be generated and displayed responsive to user interaction with the UIs and based on information accessed in object-relation data structure 350. The operations performed in the method of FIG. 6C may be performed by UI logic of control software 416 in management entity 110 or a remote computer connected to the management entity via a network, and generate for display various UIs (including UI elements or features) that are displayed on one or more display screens associated with the management entity or the remote computer. The method of FIG. 6C begins in response to a selection by the user to execute the object-relation UI.

At 635, initially, the UI logic traverses object-relation data structure 350 to identify network security devices (i.e., the root nodes of the data structure) for which security policy configurations exist. Based on this traversal, i.e., using information retrieved from object-relation data structure 350 as a result of the traversal, the UI logic generates for display on a display screen a high-level (i.e., level 1) device UI that presents (i.e., displays or shows) user selectable representations of the network security devices for which configurations exist. The network security device representations may be user selectable device icons that name the network security devices, as shown in the example of FIG. 7.

Figure 7:
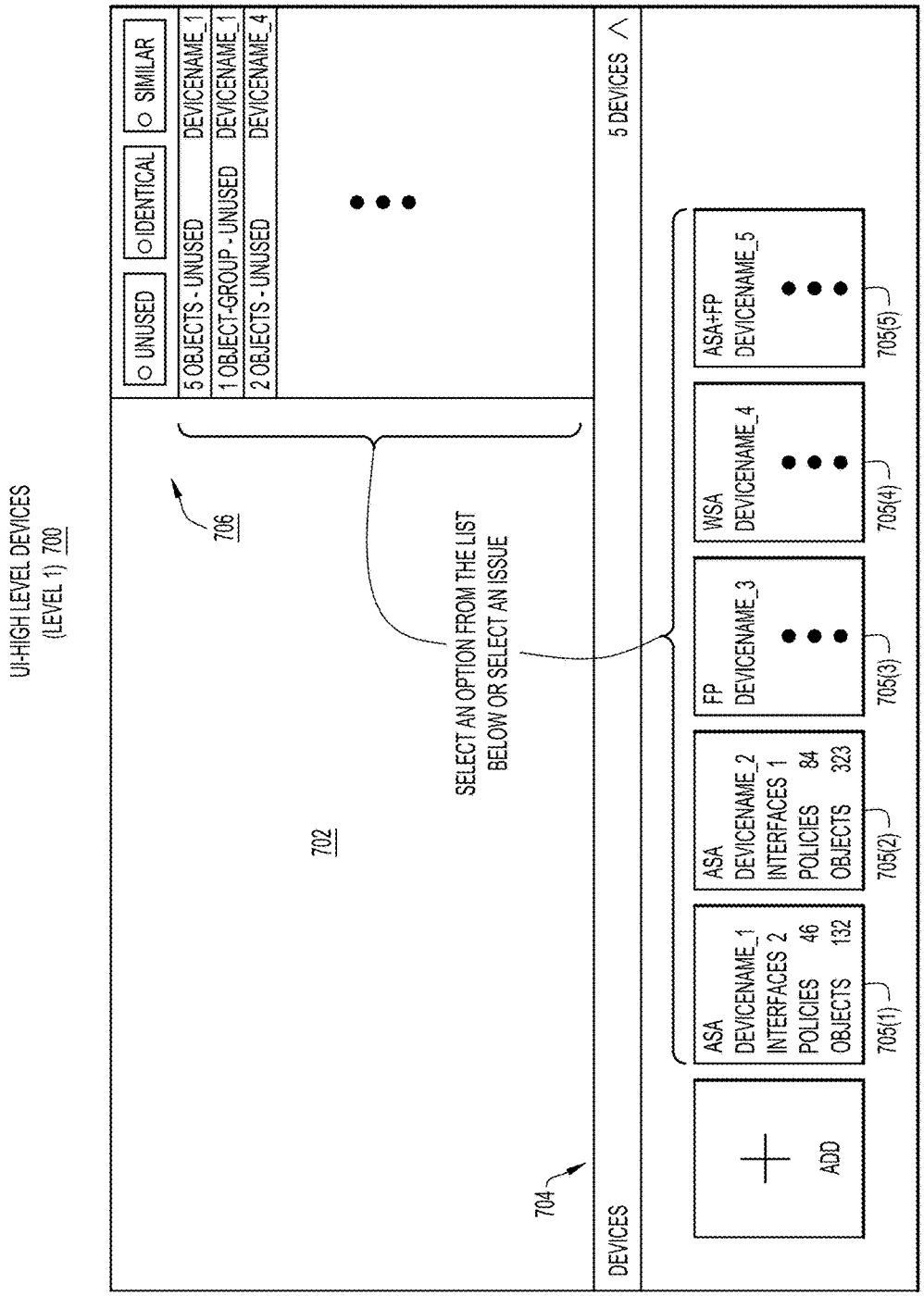
FIG. 7 is a screen shot of a device UI that shows a high-level configuration of network security devices in a datacenter, according to an example embodiment.

With reference to FIG. 7, there is an illustration of an example device UI 700 that shows a high-level configuration of network security devices 130 in customer datacenter 120. UI 700 includes a central area or portion 702, a lower portion or device panel 704 (where a "panel" is a display region/area of a predetermined shape positioned on a UI/display screen, such as a rectangular shape, a circular shape, and so on), and a right-side portion or issues panel 706. Device panel 704 presents a horizontal series of user selectable network security device icons 705(1)-705(5) each of which presents a high-level configuration of a corresponding one of network security devices 130, including, e.g., a device name, a number of network interfaces, and number of security policies, and a number of objects used by the device represented by the device icon. For example, network security device icon 705(1) shows that an Adaptive Security Appliance (ASA) has a device name 1 (DEVICENAME_1), uses 2 network interfaces (INTERFACES), and is associated with 46 security policies (POLICIES) that collectively include 132 objects (OBJECTS). Less or more information may be presented in each device icon. Issues panel 706 presents user selectable buttons each associated with respective objects or object groups for one of the devices shown in lower panel 704. Central portion 702 presents a prompt to the user to select one of network security device icons 705 or one of the buttons on right-side panel 706.

Figure 8:
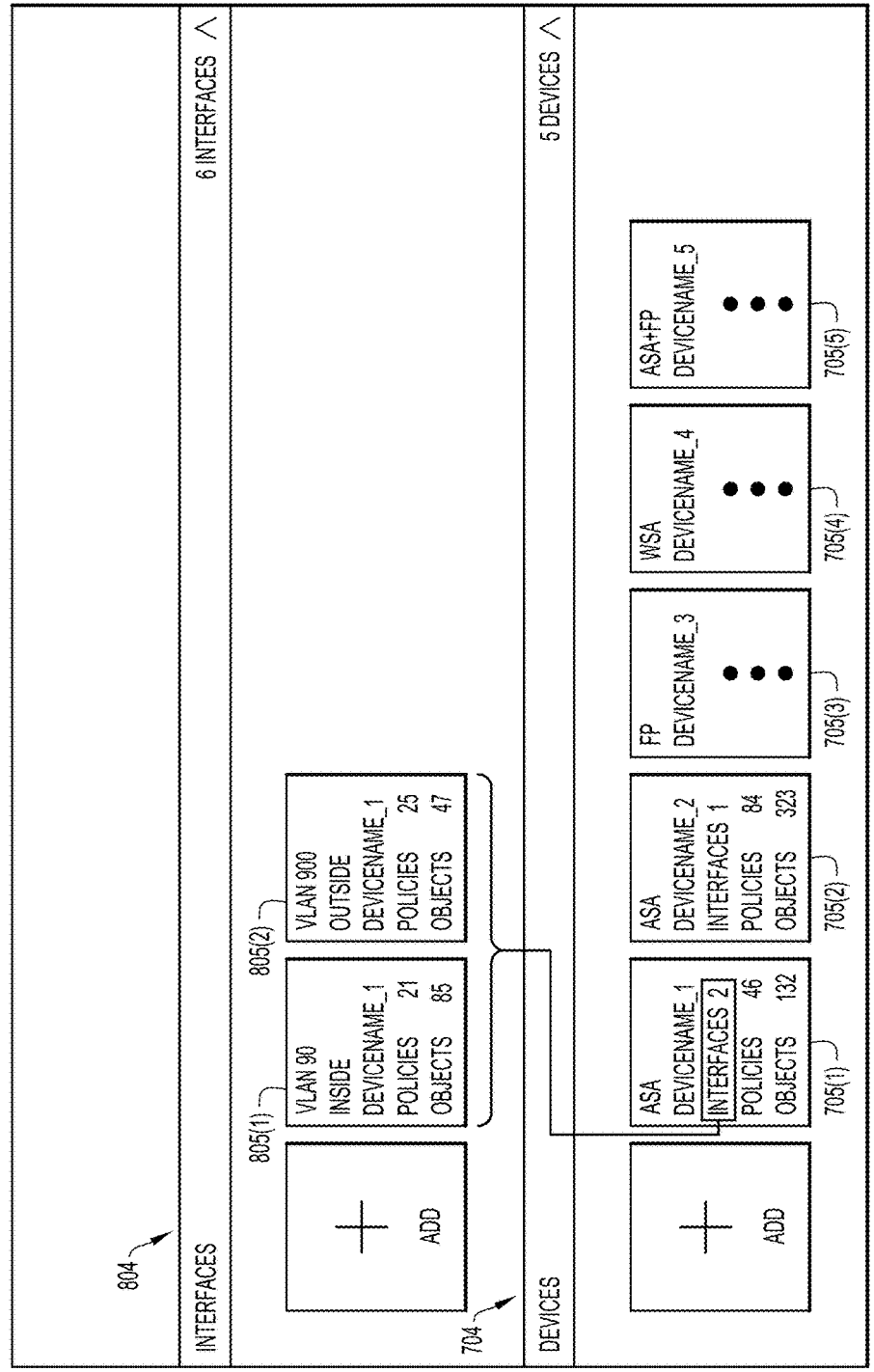
FIG. 8 is a screen shot of a UI presented when a user has selected a device icon of the UI of FIG. 7, according to an example embodiment.
Figure 9:
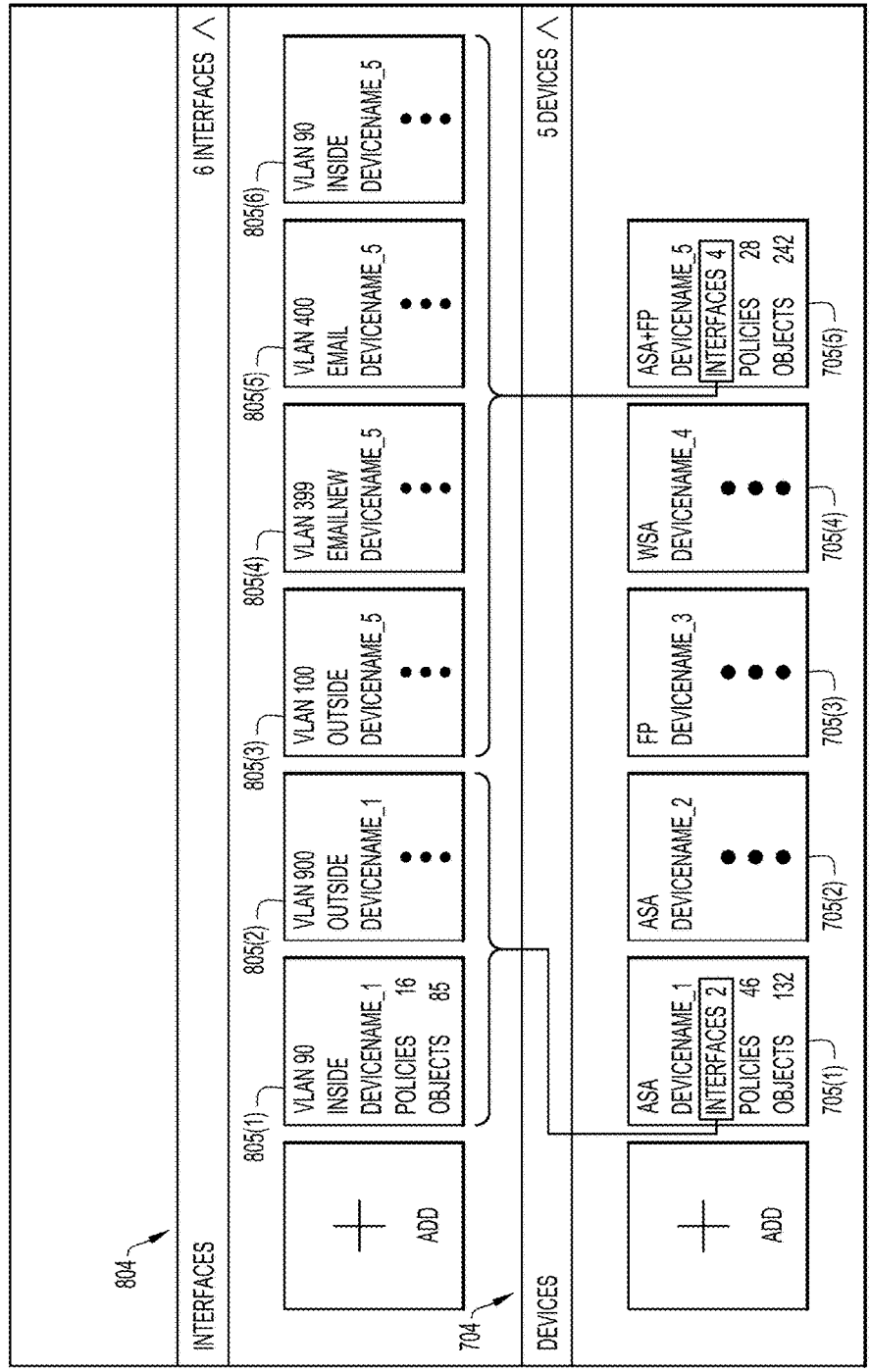
FIG. 9 is a screen shot of a UI presented when the user has selected multiple device icons of the UI of FIG. 7, according to an example embodiment.

Returning to FIG. 6C, at 640, in response to a user selection of a given network security device through the device UI from 635, the UI logic traverses object-relation data structure 350 to identify network interfaces used by the selected network security device. It is understood that the phrase "in response to a user selection" means that the UI logic has received a selection entered through the UI, and is responding to that selection. Based on this traversal, the UI logic generates for display as a second level (i.e., level 2) UI either updates to the UI from 635 or a new UI that presents user selectable representations of the network interfaces used by the selected network security device. The network interface representations may be user selectable interface icons that name the network interfaces, as shown in the examples of FIGS. 8 and 9, discussed below. In an example, the UI logic generates for concurrent display on the display screen (i.e., on a common or the same UI) the interface icons and the device icons.

With reference to FIG. 8, there is an illustration of an example UI 800 generated and presented when a user has selected network security device icon 705(1) of UI 700. In response to the (received) selection, UI 800 presents an interfaces panel 804 adjacent to (e.g., above) and concurrent with network security device panel 704. Interfaces panel 804 presents a horizontal series of user selectable network interface icons 805(1) and 805(2) each to present a high-level configuration of a corresponding one of the 2 network interfaces indicated in network security device icon 705(1). Interfaces panel 804 and devices panel 704 are positioned relative to each other so that interface icons 805 and device icons 705 do not overlap or otherwise interfere with each other visually. Each network interface icon 805(*i*) indicates the network interface (e.g., VLAN 90) used on network security device DEVICENAME_1, the number of security polices (POLICIES) that govern or control that network interface, and a number of objects (OBJECTS) in those policies. Less or more information may be presented in each icon.

With reference to FIG. 9, there is an illustration of another example UI 900 presented when the user has selected both of network security device icons 705(1) and 705(5) of UI 700. In response to the (received) selections, UI 900 presents interfaces panel 804 updated to include additional user selectable network interface icons 805(3)-805(6) each to present a high-level configuration of a corresponding one of the 4 network interfaces indicated in network security device icon 705(5).

Figure 10:
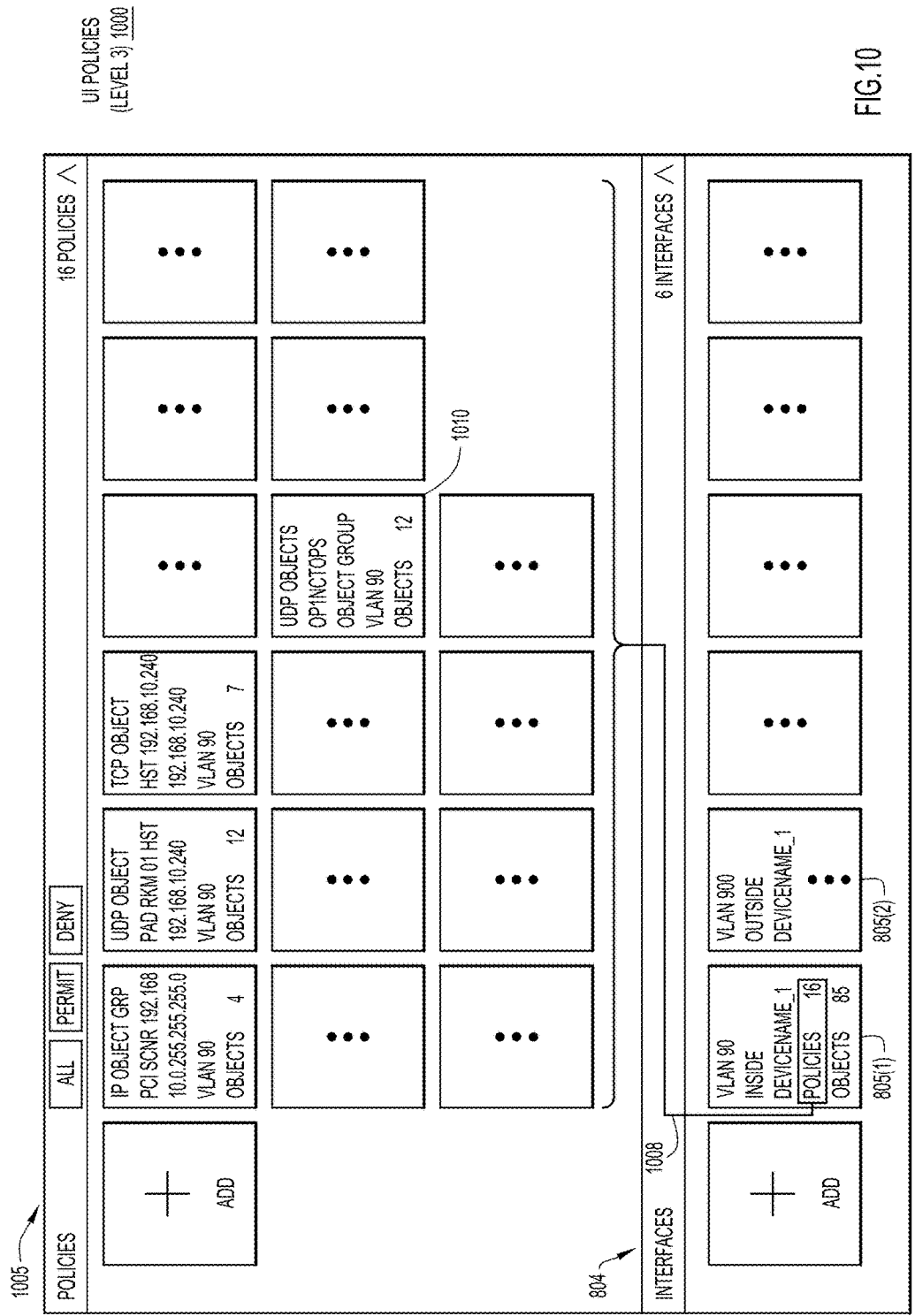
FIG. 10 is a screen shot of a UI presented when the user has selected a network interface icon of the UI of FIG. 8, according to an example embodiment.

Returning again to FIG. 6C, at 645, in response to a user selection of a given one of the network interfaces through the updated or new UI from 640, the UI logic traverses object-relation data structure 350 to identify network security polices that govern or are applied by the selected network interface. Based on this traversal, the UI logic generates for display as a level 3 UI either updates to the UI from 640 or a new UI that presents user selectable representations of the security policies that govern the selected network interface. The security policy representations may be user selectable policy icons that name the security policies, as shown in the example of FIG. 10, discussed below. In an example, the UI logic generates for concurrent display on the display screen (i.e., on a common or the same UI) the interface icons and the policy icons. The updated or new UI also presents, concurrently with the policy icons, selectable policy filter options, such as "deny" and "permit," that, when selected, limit/filter the presented security policies to be presented at a next level of UI in accordance with the selected policy filter option. In other words, the user is able to select from the UI different filters that may be applied as search criteria for what types security of policies a next or subsequent UI will present responsive to a selected policy filter option.

With reference to FIG. 10, there is an illustration of an example UI 1000 presented when the user has selected network interface icon 805(1) of UI 800. In response to the (received) selection, UI 1000 presents a security policies panel 1005 adjacent (e.g., above) and concurrent with network interfaces panel 804. Security policies panel 1005 presents user selectable policy icons 1008 each to present a high-level configuration of a corresponding one of the 21 security policies indicated in network interface icon 805(1). Each of security policy icons 1008 (e.g., policy icon 1010) indicates for the corresponding policy a network protocol (e.g., Universal Datagram Protocol (UDP)) asserted by the policy, an object name or group name as applicable, a VLAN number asserted in the policy, if applicable, and a number of objects in the policy. Less or more information may be presented in each icon. UI 1000 also presents user selectable filter options including All, Permit, and Deny which, when selected along with one of security policy icons 1008, filter the policy objects that will be presented in a next UI for the selected one of the security policy icons. For example: if All is selected, no filtering occurs; if Permit is selected, in the security policy for the selected policy icon, only objects associated with security rules configured to Permit access to a network resource will be identified (all others are filtered out) and presented in a subsequent UI; if Deny is selected, in the security policy for the selected policy icon, only objects associated with security rules that Deny access to a network resource will be identified (all others are filtered out) and presented in a subsequent UI.

Figure 11:
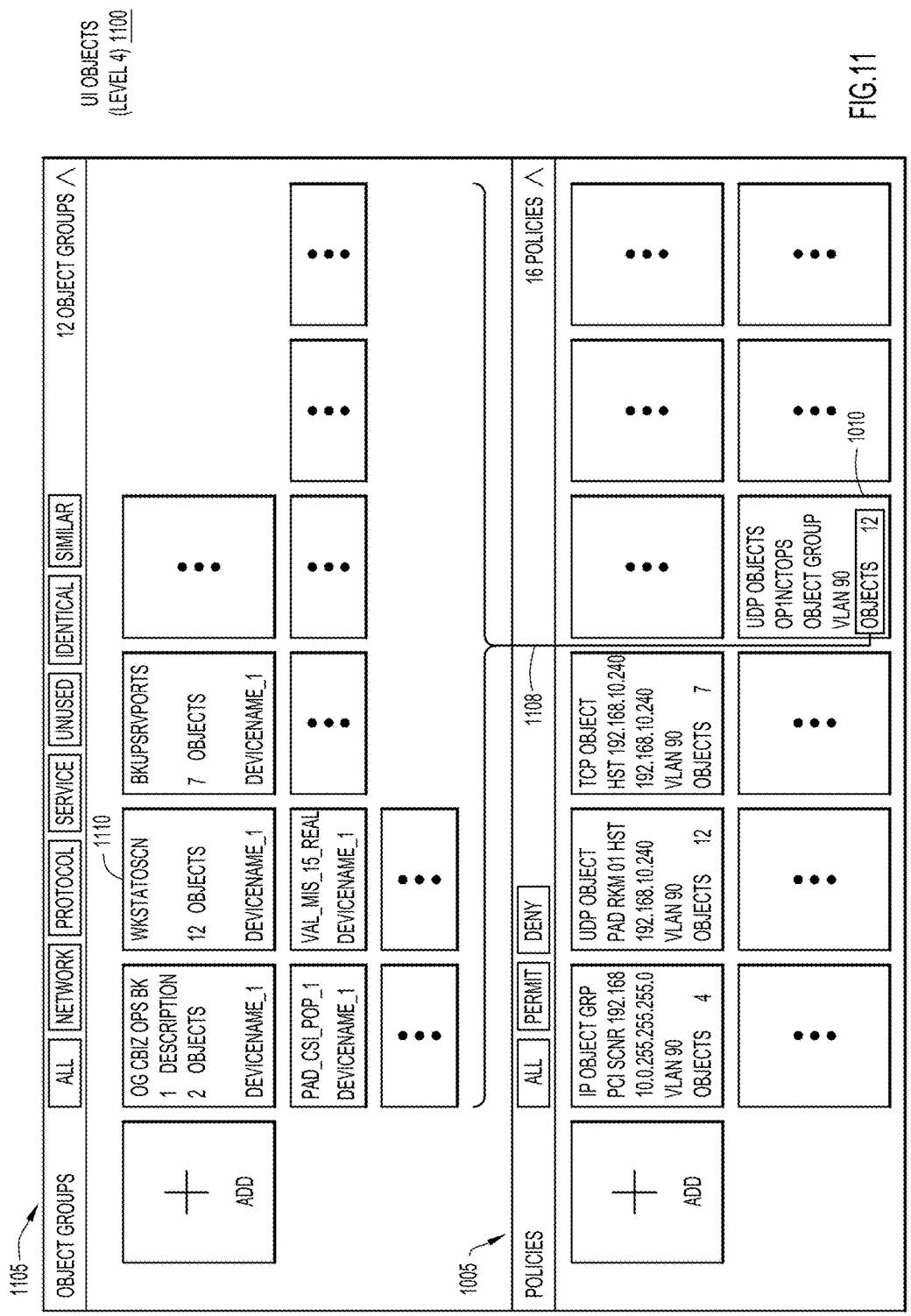
FIG. 11 is a screen shot of a UI presented when the user has selected a security policy icon in the UI of FIG. 10, according to an example embodiment.

Returning again to FIG. 3B, at 650, in response to a user selection of a given one of the security policies through the updated UI from 645, and a selection of a filter option, if any, the UI logic traverses object-relation data structure 350 to identify objects and their numbers defined in security rules associated with the selected security policy. The identified objects may be divided among different groups of one or more objects (i.e., "object groups"), where each object group may include one or more objects defined in one or more security rules of the selected security policy. Based on this traversal, the UI logic generates for display a level 4 UI as either updates to the UI from 645 or a new UI that presents user selectable representations of the object groups of the selected security policy. The object group representations may be user selectable object group icons that name the object groups represented thereby, as shown in the example of FIG. 11. In an example, the UI logic generates for concurrent display on the display screen (i.e., on a common UI) the policy icons and the object group icons. The UI generated at 650 also presents, concurrently with the object group icons, user selectable object filter options (also shown by way of example in FIG. 11) which, when selected, causes filtering of the type of objects that will be presented in a next UI.

With reference to FIG. 11, there is an illustration of an example UI 1100 presented when the user has selected security policy icon 1010 of UI 1000. In response to the (received) selection, UI 1100 concurrently presents an object groups panel 1105 adjacent to (e.g., above) security policies panel 1005. Object groups panel 1105 presents user selectable object group icons 1108 each to present a high-level configuration of a corresponding one of the 12 object groups indicated in security policy icon 1010. Each of object group icons 1108 (e.g., objects group icon 1110) indicates for the corresponding object group a name of a device controlled by the objects under the object group icon (e.g., workstation to scan "WKSTATOSCN"), the number of objects under the object group icon, and the device name of the device associated with the objects of the object group. Less or more information may be presented in each icon. In another example, the "objects groups" panel may also be referred to as simply an "objects panel."

UI 1100 also presents, concurrently with the object group icons, user selectable object filter options including Network, Protocol, Service, Unused, Identical, and Similar which, when selected, causes filtering of the type of objects that will be presented in a next UI. For example: if Protocol is selected, only protocol objects (e.g., objects that specify UDP, IP, TCP, and the like.) will be presented, and so on. In another example, if the Identical filter is selected, the UI logic traverses object-relation data structure 350 to identify identical objects among the object groups represented by the object icons, and then presents the identified identical objects. In another example, if the Similar filter is selected, object-relation data structure 350 is traversed to identify similar objects among the object groups represented by the object icons, which are then presented.

Returning again to FIG. 6C, at 655, in response to a user selection of a given one of the object group icons in the updated UI from 650, the UI logic traverses object-relation data structure 350 to identify the low-level content, such as object values, for each of the individual objects (sub-objects) associated with the selected object group. Based on this traversal, the UI logic generates for display as a level 6 UI either updates to the UI from 650 or a new UI that presents the low-level content for each of the individual objects of the selected high-level object. Such low-level content may include, e.g., source and/or destination IP addresses of an access control list rule. In an example, the UI logic generates for concurrent display on the display screen (i.e., on a common UI) the object values and the device icons.

Figure 12:
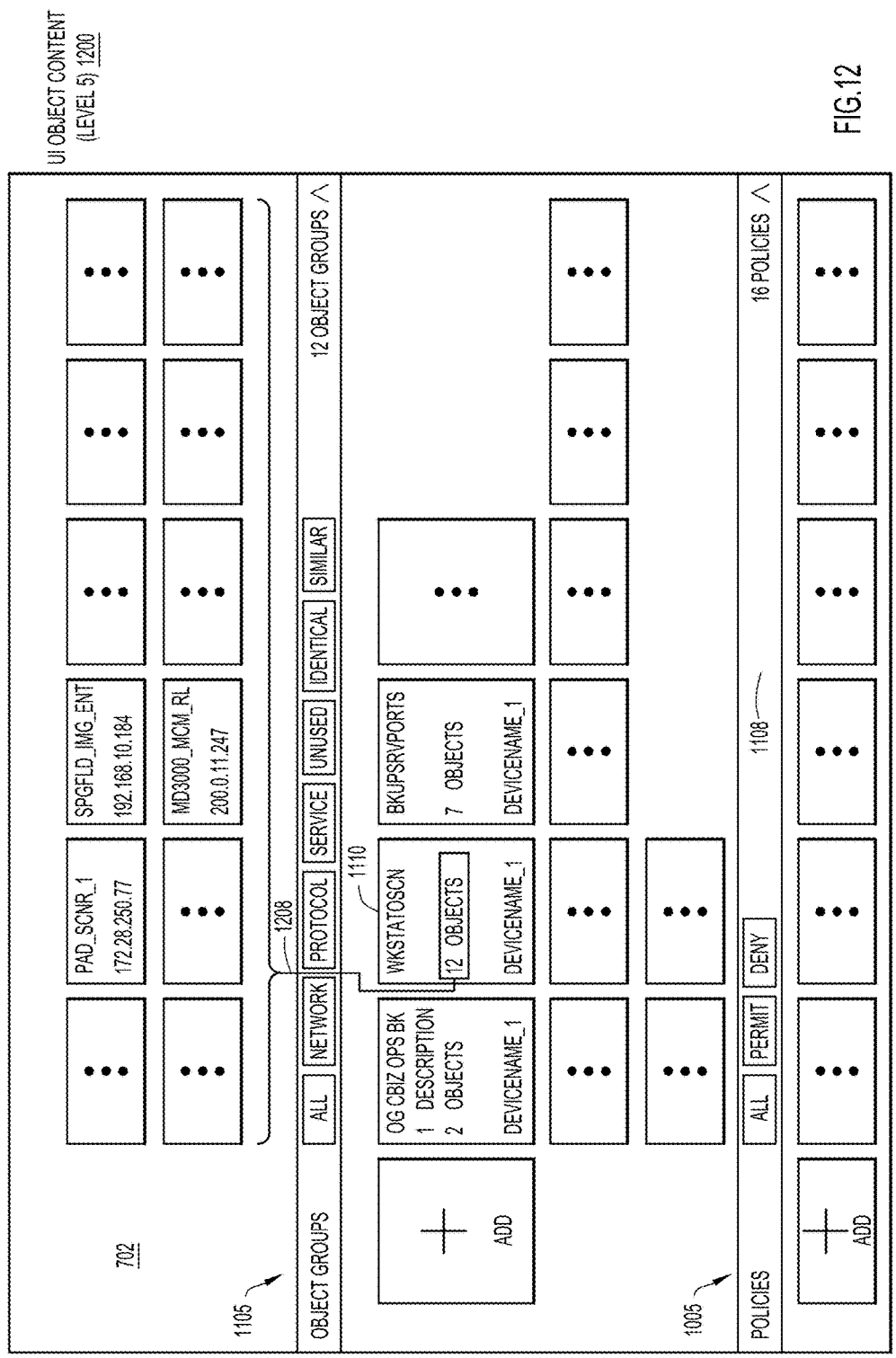
FIG. 12 is a screen shot of a UI presented when the user has selected an object group icon in the UI of FIG. 11, according to an example embodiment.

With reference to FIG. 12, there is an illustration of an example UI 1200 presented when the user has selected object group icon 1110 of UI 1100. In response to the (received) selection, UI 1200 presents in expansion area 702 (from UI 700) user selectable object content icons 1208. Object content icons 1208 each presents low-level content, such as values, of a corresponding one of the 12 objects indicated in selected object icon 1110. In the example, of FIG. 12, the object contents of each object is an IP address. Less or more information may be presented in each icon. Expansion area 702 of UI 1200 permits selection of various ones of content icons 1208 and editing of the selected content icon. Such editing may include deleting the selected icon or modifying the selected icon. In addition, expansion area 702 may permit adding new object icons to the existing object icons.

In the embodiments described above, concurrent presentation of different icon types (i.e., device icons, interface icons, policy icons, and object group icons) and object values responsive to user selection of the different icons to navigate through different level UIIs visually reveals relationships and connections between devices, their network interfaces, the network security policies used by the network interfaces, the object groups used by the network security policies, and the corresponding object values. Other combinations of concurrent display may be used. For example, the UI logic may generate for concurrent display on the display screen/common UI various device icons, various interface icons, various policy icons, various object group icons, and various object values.

Thus, UIs show connections (or associations) between the selected high-level object and other objects as the user navigates through other UIs related to the selected object. The connections may include low-level connections to other objects and high-level connections to other security policies that include the selected object. Further connections show the network security devices and network interfaces that are affected by the selected object. Thus, the user is presented with connections between network security devices, security policies, and the selected object.

The UI logic may generate for display the above described UIs so that the UIs present selectable objects in upper, lower, left, or right portions/panels of a display, and may present the information belonging to a selected one of those objects in lower, upper, right, or left portions of the display, respectively, referred to as a "work bench" for the selected object. The user may then edit the details presented in the work bench or join those details with other objects.

If a selected object includes a nesting of objects, when the user selects the object, the appropriate UI presents the objects nested within the selected object, and so on to the bottom of the nesting levels.

In summary, in one form, a computer implemented method is provided comprising: generating for display selectable device icons that represent respective network security devices; responsive to a selection of one of the device icons, generating for display selectable interface icons that represent respective network interfaces used by the network security device represented by the selected device icon; responsive to a selection of one of the interface icons, generating for display selectable policy icons that represent respective security polices used by the network interface represented by the selected interface icon, the security policies including security rules, each security rule including objects arranged according to a rule syntax to control access to a resource, at least some of the objects having respective object values; and responsive to a selection of one of the policy icons, generating for display selectable object group icons that represent respective groups of objects used in the security policy represented by the selected policy icon.

In another form, an apparatus is provided comprising: a network interface unit configured to enable communications over a network; and a processor, coupled to the network interface unit, configured to: generate for display selectable device icons that represent respective network security devices; responsive to a selection of one of the device icons, generate for display selectable interface icons that represent respective network interfaces used by the network security device represented by the selected device icon; responsive to a selection of one of the interface icons, generate for display selectable policy icons that represent respective security polices used by the network interface represented by the selected interface icon, the security policies including security rules, each security rule including objects arranged according to a rule syntax to control access to a resource, at least some of the objects having respective object values; and responsive to a selection of one of the policy icons, generate for display selectable object group icons that represent respective groups of objects used in the security policy represented by the selected policy icon.

In yet another form, a non-transitory tangible computer readable storage media encoded with instructions is provided. The instructions, when executed by a processor, cause the processor to: generate for display selectable device icons that represent respective network security devices; responsive to a selection of one of the device icons, generate for display selectable interface icons that represent respective network interfaces used by the network security device represented by the selected device icon; responsive to a selection of one of the interface icons, generate for display selectable policy icons that represent respective security polices used by the network interface represented by the selected interface icon, the security policies including security rules, each security rule including objects arranged according to a rule syntax to control access to a resource, at least some of the objects having respective object values; and responsive to a selection of one of the policy icons, generate for display selectable object group icons that represent respective groups of objects used in the security policy represented by the selected policy icon.

The above description is intended by way of example only. Various modifications and structural changes may be made therein without departing from the scope of the concepts described herein and within the scope and range of equivalents of the claims.

What is claimed is:

1. A computer implemented method comprising:
generating an object-relation user interface for viewing security configurations of network security devices on a display, wherein the generating includes:
generating for display by a computer device and displaying selectable device icons that represent respective network security devices;
responsive to a selection of one of the displayed device icons, generating for display by the computer device and displaying selectable interface icons that represent respective network interfaces used by the network security device represented by the selected device icon;
responsive to a selection of one of the displayed interface icons, generating for display by a computer device and displaying selectable policy icons that represent respective security polices used by the network interface represented by the selected interface icon, the security policies including security rules, each security rule including objects arranged according to a predetermined rule syntax to control access to a resource, at least some of the objects having respective object values;
responsive to a selection of one of the displayed policy icons, generating for display by a computer device and displaying selectable object group icons that represent respective groups of objects used in the security policy represented by the selected policy icon;
responsive to a selection of one of the displayed object group icons, generating for display by the computer device and displaying for the security rule objects in the group of objects represented by the selected object group icon respective object values in an editable form that permits editing of the object values, including adding a new object value, deleting one of the object values, or modifying one of the object values of the object-relation user interface for viewing the security configurations of the network security devices;

generating for concurrent display a selectable identical filter, a selectable similar filter, and the object group icons;
receiving a selection of either the identical filter or the similar filter;
in response to a selection of the identical filter being received;
identifying identical objects among the object groups represented by the object group icons, and
generating for display the identical objects; and
in response to a selection of the similar filter being received;
identifying similar objects among the object groups represented by the object group icons, and
generating for display the similar objects.

2. The method of claim 1, wherein each device icon indicates, for the network security device represented by the device icon:
a type of network security device;
a network security device name; and
at least one of:
a number of network interfaces of the network security device; or
a number of network security policies used by the network security device and a number of security rule objects in the network security policies.

3. The method of claim 1, wherein each interface icon indicates, for the network interface represented by the interface icon, a network interface name, a name of the network security device that uses the network interface, and at least one of a number of security policies used by the network interface or a number of objects in the security policy.

4. The method of claim 1, wherein each policy icon indicates, for the security policy represented by the policy icon, a name of the security policy, and a number of objects in the security policy.

5. The method of claim 1, wherein each object group icon indicates, for the group of objects represented by the object group icon, a name of the group of objects, a name of a network interface that uses the group of objects, and a number of objects in the group of objects.

6. The method of claim 1, further comprising:
generating for concurrent display the device icons and the interface icons; and
generating for concurrent display the interface icons and the policy icons.

7. The method of claim 6, further comprising:
generating for concurrent display the policy icons and the object group icons; and
generating for concurrent display the object group icons and the object values.

8. The method of claim 1, further comprising:
generating for concurrent display a selectable permit filter, a selectable deny filter, and the selectable policy icons;
receiving, in addition to the selection of the policy icon, a selection of either the permit filter or the deny filter;
if the permit filter is selected, identifying in the security policy represented by the selected policy icon security rules configured to permit access to a network resource; and
if the deny filter is selected, identifying in the security policy represented by the selected policy icon security rules configured to deny access to a network resource; and
generating for display objects used by the identified security rules.

9. An apparatus comprising:
a network interface unit configured to enable communications over a network; and
a hardware processor, coupled to the network interface unit, configured to generate an object-relation user interface for viewing security configurations of network security devices on a display, wherein the processor is configured to:
generate for display selectable device icons that represent respective network security devices;
responsive to a selection of one of the device icons, generate for display selectable interface icons that represent respective network interfaces used by the network security device represented by the selected device icon;
responsive to a selection of one of the interface icons, generate for display selectable policy icons that represent respective security polices used by the network interface represented by the selected interface icon, the security policies including security rules, each security rule including objects arranged according to a predetermined rule syntax to control access to a resource, at least some of the objects having respective object values;
responsive to a selection of one of the policy icons, generate for display selectable object group icons that represent respective groups of objects used in the security policy represented by the selected policy icon;
responsive to a selection of one of the object group icons, generate for display for the security rule objects in the group of objects represented by the selected object group icon respective object values in an editable form that permits editing of the object values, including adding a new object value, deleting one of the object values, or modifying one of the object values of the object-relation user interface for viewing the security configurations of the network security devices;
generating for concurrent display a selectable identical filter, a selectable similar filter, and the object group icons;
receiving a selection of either the identical filter or the similar filter;
in response to a selection of the identical filter being received;
identifying identical objects among the object groups represented by the object group icons, and
generating for display the identical objects; and
in response to a selection of the similar filter being received;
identifying similar objects among the object groups represented by the object group icons, and
generating for display the similar objects.

10. The apparatus of claim 9, wherein each device icon indicates, for the network security device represented by the device icon:
a type of network security device;
a network security device name; and
at least one of:
a number of network interfaces of the network security device; or
a number of network security policies used by the network security device and a number of security rule objects in the network security policies.

11. The apparatus of claim 9, wherein the processor is further configured to:
generate for concurrent display the device icons and the interface icons; and
generate for concurrent display the interface icons and the policy icons.

12. The apparatus of claim 11, wherein the processor is further configured to:
generate for concurrent display the policy icons and the object group icons; and
generate for concurrent display the object group icons and the object values.

13. The apparatus of claim 9, wherein each interface icon indicates, for the network interface represented by the interface icon, a network interface name, a name of the network security device that uses the network interface, and at least one of a number of security policies used by the network interface or a number of objects in the security policy.

14. The apparatus of claim 9, wherein each policy icon indicates, for the security policy represented by the policy icon, a name of the security policy, and a number of objects in the security policy.

15. The apparatus of claim 9, wherein each object group icon indicates, for the group of objects represented by the object group icon, a name of the group of objects, a name of a network interface that uses the group of objects, and a number of objects in the group of objects.

16. A non-transitory computer readable storage media encoded with instructions that, when executed by a processor, cause the processor to perform:
generating an object-relation user interface for viewing security configurations of network security devices on a display, wherein the generating includes:
generating for display selectable device icons that represent respective network security devices;
responsive to a selection of one of the device icons, generating for display selectable interface icons that represent respective network interfaces used by the network security device represented by the selected device icon;
responsive to a selection of one of the interface icons, generating for display selectable policy icons that represent respective security polices used by the network interface represented by the selected interface icon, the security policies including security rules, each security rule including objects arranged according to a predetermined rule syntax to control access to a resource, at least some of the objects having respective object values;
responsive to a selection of one of the policy icons, generating for display selectable object group icons that represent respective groups of objects used in the security policy represented by the selected policy icon;
responsive to a selection of one of the object group icons, generating for display for the security rule objects in the group of objects represented by the selected object group icon respective object values in an editable form that permits editing of the object values, including adding a new object value, deleting one of the object values, or modifying one of the object values of the object-relation user interface for viewing the security configurations of the network security devices;
generating for concurrent display a selectable identical filter, a selectable similar filter, and the object group icons;
receiving a selection of either the identical filter or the similar filter;
in response to a selection of the identical filter being received;
identifying identical objects among the object groups represented by the object group icons, and generating for display the identical objects; and in response to a selection of the similar filter being received;

identifying similar objects among the object groups represented by the object group icons, and generating for display the similar objects.

17. The computer readable storage media of claim 16, wherein each device icon indicates, for the network security device represented by the device icon:

a type of network security device;

a network security device name; and at least one of:

a number of network interfaces of the network security device; or a number of network security policies used by the network security device and a number of security rule objects in the network security policies.

18. The computer readable storage media of claim 16, further comprising instructions to cause the processor to further perform:

generating for concurrent display the device icons and the interface icons; and generating for concurrent display the interface icons and the policy icons.

19. The computer readable storage media of claim 18, further comprising instructions to cause the processor to further perform:

generating for concurrent display the policy icons and the object group icons; and generating for concurrent display the object group icons and the object values.

20. The non-transitory computer readable storage media of claim 16, wherein each interface icon indicates, for the network interface represented by the interface icon, a network interface name, a name of the network security device that uses the network interface, and at least one of a number of security policies used by the network interface or a number of objects in the security policy.

21. The non-transitory computer readable storage media of claim 16, wherein each policy icon indicates, for the security policy represented by the policy icon, a name of the security policy, and a number of objects in the security policy.

22. The non-transitory computer readable storage media of claim 16, wherein each object group icon indicates, for the group of objects represented by the object group icon, a name of the group of objects, a name of a network interface that uses the group of objects, and a number of objects in the group of objects.

* * * * *